(12) United States Patent
Simon

(10) Patent No.: US 8,788,470 B2
(45) Date of Patent: Jul. 22, 2014

(54) ALLOCATING AND MANAGING RANDOM IDENTIFIERS USING A SHARED INDEX SET ACROSS PRODUCTS

(75) Inventor: Nisanth M. Simon, Kerala (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/618,078

(22) Filed: Sep. 14, 2012

(65) Prior Publication Data

US 2013/0013610 A1    Jan. 10, 2013

Related U.S. Application Data

(63) Continuation of application No. 12/875,806, filed on Sep. 3, 2010, now Pat. No. 8,386,447.

(51) Int. Cl.
*G06F 17/30* (2006.01)

(52) U.S. Cl.
CPC ................ *G06F 17/30321* (2013.01)
USPC ........................................ 707/696

(58) Field of Classification Search
CPC .......... G06F 17/30321; G06F 17/3094; G06F 17/30949
USPC .......................... 707/673, 696, 741
See application file for complete search history.

(56) References Cited

U.S. PATENT DOCUMENTS

| | | | |
|---|---|---|---|
| 5,913,217 A * | 6/1999 | Alger et al. .................... | 713/502 |
| 6,505,205 B1 | 1/2003 | Kothuri et al. | |
| 6,920,469 B2 | 7/2005 | Cooke et al. | |
| 7,137,566 B2 | 11/2006 | Silverbrook et al. | |
| 2006/0181397 A1* | 8/2006 | Limbachiya ............... | 340/10.51 |
| 2007/0018002 A1 | 1/2007 | Lapstun et al. | |
| 2009/0055346 A1 | 2/2009 | Chijiiwa et al. | |
| 2009/0187979 A1 | 7/2009 | Sever | |
| 2012/0059824 A1 | 3/2012 | Simon | |

OTHER PUBLICATIONS

Axway, "Business and Supply Chain Logistics Management—Axway Track and Trace—See the Big Picture . . . Down to the Smallest Detail", [online], [Retrieved on Aug. 10, 2010]. Retrieved from the Internet at <URL: http://www.axway.com/products-solutions/integration/track-trace>, © 2010 Axway, Total 1 p.

Efpia, "Product Verification System: European Pack Coding Guidelines", Feb. 2009, Version 2.0, Total 6 pp.

Johnston, R.G., "An Anti-Counterfeiting Strategy Using Numeric Tokens", 2005, Total 21 pp.

McFarlane, D., "Auto ID Based Control Systems—An Overview", © 2002 IEEE SMC TA1R4, Total 6 pp.

Polytarchos, E. N. Leontiadis, S. Eliakis, and K. Pramatari, "A Lookup Service in an Interconnected World of Uniquely Identified Objects", © 2008 IEEE, Total 8 pp.

(Continued)

*Primary Examiner* — Thu-Nguyet Le
(74) *Attorney, Agent, or Firm* — Janaki K. Davda; Konrad, Raynes, Davda & Victor LLP

(57) ABSTRACT

Provided are techniques for selecting row identifiers from an initial index structure storing rows of randomized indexes. The row identifiers are randomized. Groups are formed with the randomized row identifiers so that each group has a predetermined number of row identifiers. At least one group is selected from the groups. Indexes are retrieved from the initial index structure that correspond to the row identifiers in the selected at least one group. The retrieved indexes are encoded by adding product information to form new identifiers.

18 Claims, 15 Drawing Sheets

(56) References Cited

OTHER PUBLICATIONS rfXcel, "Safety Through Traceability", [online], © 2006-2009 rfXcel, [Retrieved on Aug. 10, 2010]. Retrieved from the Internet at <URL: http://www.rfxcel.com/>, Total 1 p.

SAP AG, "SAP RFID Technology in the Automotive Industry", © 2005 SAP AG, Total 6 pp.

Amendment 1, Sep. 6, 2012, for U.S. Appl. No. 12/875,806, filed Sep. 3, 2010 by N.M. Simon, Total 8 pp. [57.209 (Amend1)].

Office Action 1, Jun. 27, 2012, for U.S. Appl. No. 12/875,806, filed Sep. 3, 2010 by N.M. Simon, Total 9 pp. [57.209 (OA1)].

Notice of Allowance 1, dated Oct. 23, 2012, for U.S. Appl. No. 12/875,806, 10 pp. [57.209 (NOA1)].

* cited by examiner

ALLOCATING AND MANAGING RANDOM IDENTIFIERS USING A SHARED INDEX SET ACROSS PRODUCTS

CROSS-REFERENCE TO RELATED APPLICATION

This application is a continuation of U.S. Pat. No. 8,386,447, having U.S. patent application Ser. No. 12/875,806, filed Sep. 3, 2010, which application is incorporated herein by reference in its entirety.

BACKGROUND

1. Field

Embodiments of the invention relate to allocating and managing identifiers using a shared index set across products.

2. Description of the Related Art

Any manufacturer of products (e.g., consumer products, pharmaceutical drugs or automobile parts) wants to track the products as they move in a supply chain. In order to track each individual product (or "individual unit") of a set of products, the individual product is uniquely identified, within a same class of products, using some sort of number or identifier (ID). The general term used in the industry for this identifier is "serial ID". Depending on the type of the products, packaging level, and the technology used to tag the serial ID (e.g., bar code, Radio Frequency Identification (RFID), etc.), there are various encoding schemes and standards to encode the serial ID.

Serialization is important for any traceability solution, and many of the traceability software products in the market offer this capability only partially. For example, some traceability software supports only allocation of sequential numbers. Managing sequential numbers is straight forward. The complexity lies in managing random numbers.

The European Federation of Pharmaceuticals Industries and Association (EFPIA) has issued European Pack Coding Guidelines. The EFPIA represents the pharmaceutical industry operating in Europe.

The EFPIA came up with the European Pack Coding Guidelines for the serial IDs. The European Pack Coding Guidelines, in Section 1.1.2.1, describe how random numbers should be generated. Moreover, the European Pack Coding Guidelines describe that, in order to provide a reasonable level of complexity within the serial number, the probability that a valid serial number can be 'guessed' should be a minimum of 1 in 10,000.

There are two categories of solutions to guarantee uniqueness. A first category includes a process that uses a set of well-defined instructions (e.g., an algorithm) to guarantee uniqueness (e.g., Universally Unique Identifier (UUID) generators) and provides fast generation. However, this first category has several drawbacks. For example, a UUID generator uses network Internet Protocol (IP), time, and other factors to generate fixed length IDs (usually 128 bits). Also, it is not possible to control the space from which a serial ID is generated. Moreover, UUID's are not enumerable.

A second category includes guaranteed unique ID generation after comparing against a persisted data store of previously generated serial IDs. However, this second category has several drawbacks. For example, in a mass generation scenario, the requested quantity of serial IDs may go up to a million serial IDs, and insertion/update of serial IDs in a database takes more time and leads to an unacceptable turn around time. As an example, experimentation showed that batch update is faster than batch insert, but even the batch update of one million IDs degrades the turn-around time. Also, the serial ID per product is stored as a row in a data store, and the structure of the row is (serial ID, Product, Status).

BRIEF SUMMARY

Provided are a method, computer program product, and system for selecting row identifiers from an initial index structure storing rows of randomized indexes. The row identifiers are randomized. Groups are formed with the randomized row identifiers so that each group has a predetermined number of row identifiers. At least one group is selected from the groups. Indexes are retrieved from the initial index structure that correspond to the row identifiers in the selected at least one group. The retrieved indexes are encoded by adding product information to form new identifiers.

BRIEF DESCRIPTION OF THE SEVERAL VIEWS OF THE DRAWINGS

Referring now to the drawings in which like reference numbers represent corresponding parts throughout:

FIG. 3 is formed by FIGS. 3A, 3B, 3C and 3D.

FIG. 4 is formed by FIGS. 4A, and 4B.

FIG. 5 is formed by FIGS. 5A, 5B, 5C, 5D, and 5E.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
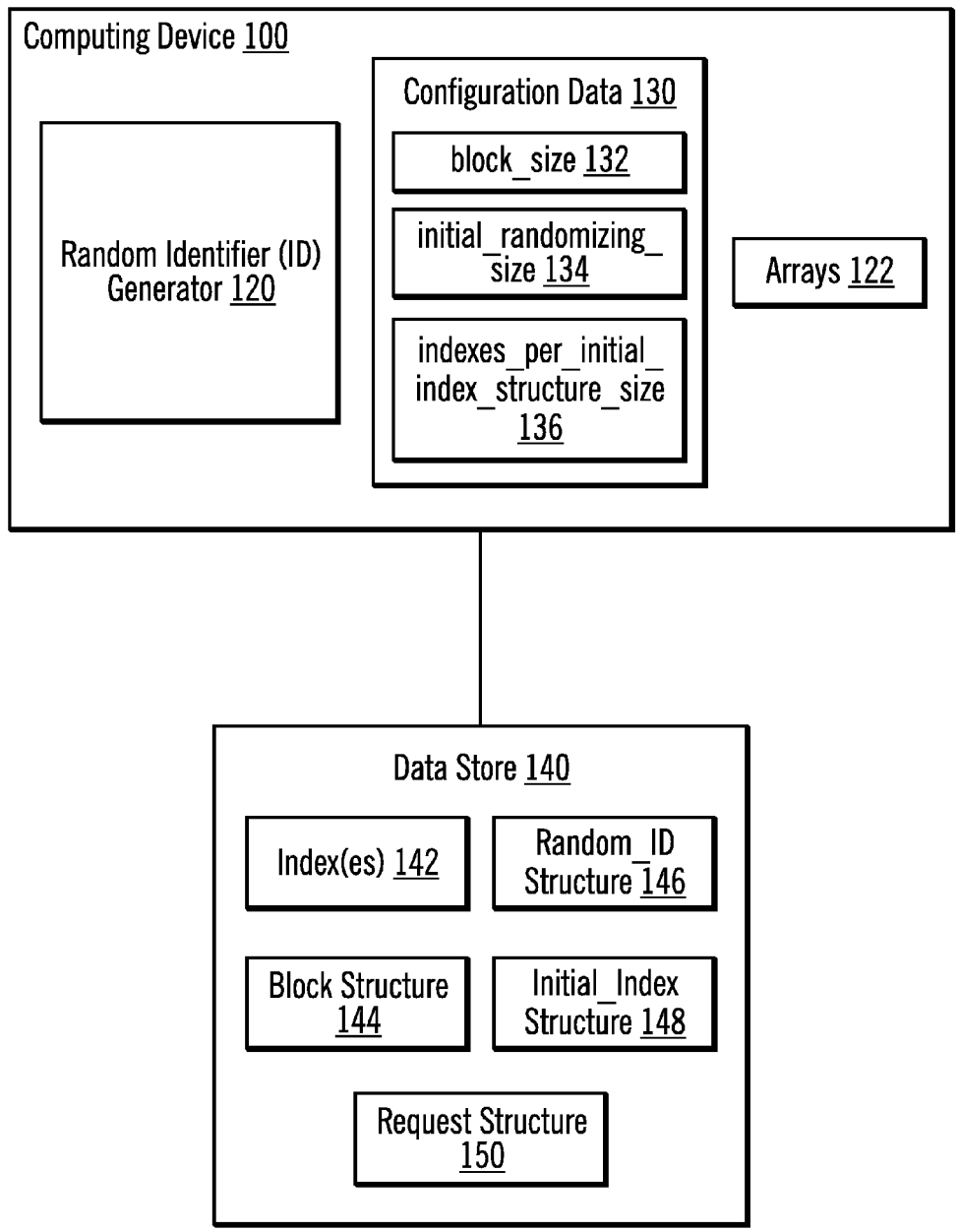
FIG. 1 illustrates, in a block diagram, a computing device in accordance with certain embodiments.

FIG. 1 illustrates, in a block diagram, a computing device 100 in accordance with certain embodiments. The computing device 100 includes a random identifier (ID) generator 120, arrays 122, and configuration data 130. The arrays 122 represent various arrays used in embodiments. The configuration data 130 includes a block_size 132 of a block of indexes from a larger space (e.g., range or a larger set) of indexes, an initial_randomizing_size 134, and an indexes_per_initial_indexes_structure_size 136.

The computing device 100 is coupled to a data store 140. The data store 140 stores one or more indexes 142, a block structure 144, a random_ID (also referred to as "random identifier") structure 146, an initial_index (also referred to as "initial index") structure 148, and a request structure 150. In certain embodiments, the data store 140 is a database, and structures 144, 146, 148, 150 are tables. In certain embodiments, an index is a numeric value. In various embodiments, the index may have an alphanumeric value, an alphabet value or other value. In certain alternative embodiments, the index value is mapped to another value (e.g., if the index value is "A", the index value is mapped to "1", or vice versa).

Figure 2:
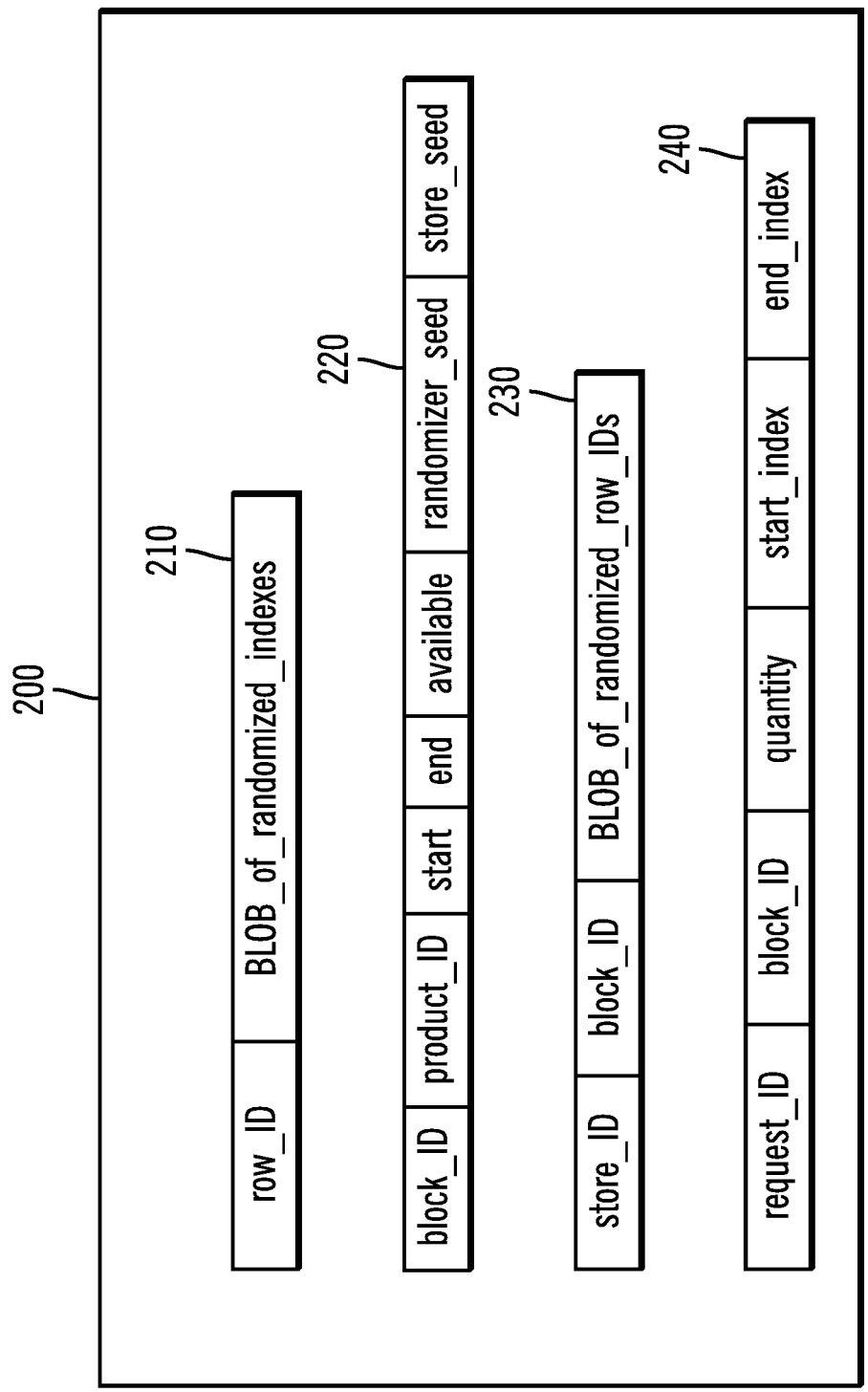
FIG. 2 illustrates, in a block diagram, tables used in accordance with certain embodiments.

FIG. 2 illustrates, in a block diagram, tables 200 used in accordance with certain embodiments. An initial_index table 210 is an example of an initial_index structure 148. The initial_index table 210 may store indexes that are shared across different blocks of indexes and across different products (e.g., cell phones and laptops may share the same indexes). In certain embodiments, each row of the initial_index table 210 includes a column for a row_ID and a column for a BLOB_of_randomized_indexes.

A block table 220 is an example of block structure 144. The block table 220 acts as an inventory of records. Each row of the block table has a column for a block_ID (used to identify a block of indexes from a larger space of indexes), a column for a product_ID (used to identify a product), a column for start of the block, a column for end of the block, a column for availability of a block, a column for a randomizer_seed, and a column for a store_seed. The randomizer_seed is used to randomize the indexes taken from a row (i.e., a BLOB) in the initial_index table 210. The store_seed is used to randomize the row_IDs of the initial_index table 210.

A set of randomized row_IDs are stored in the random_ID table 230 as a BLOB. The random_ID table 230 is an example of random_ID structure 146. The random_ID table 230 has a column for a store_ID, a column for a block_ID, and a column for a BLOB_of_randomized_row_IDs. The store_ID may be described as a key that is used to uniquely identify each row in the random_ID table. The store_ID is similar to a primary key. The BLOB_of_randomized_row_IDs stores an array of randomized row_IDs, and this randomized array is different for each block (identified by the block_ID).

A request table 240 is an example of a request structure 150. The request table 240 has a column for a request_ID (identifying the received request for a quantity of IDs), a block_ID, a quantity, a start_index, and an end_index.

The random ID generator 120 generates random unique identifiers (IDs (e.g., serial IDs)) for products using a shared index set. In order to make it harder for counterfeiters to guess a next set of IDs, the IDs for at least some products follow a random pattern (e.g., non-sequential). In order to minimize the counterfeiting, the IDs are generated using indexes taken from a larger space (i.e., a larger set of indexes). The entropy of generated IDs should be large.

For various reasons (e.g., legal auditing or reporting), the random ID generator 120 creates IDs that are enumerable. The random ID generator 120 ensures uniqueness of the IDs (i.e., no duplicate IDs are generated) and no IDs are wasted (i.e., unused) from the larger space of indexes as the random ID generator 120 is able to generate all of the IDs using all of the indexes in the space. With the random ID generator 120, the IDs generated can vary in length for different products (e.g., from 16 bits to 140 bits or more).

In mass production scenarios, where the products produced per hour is extremely high, a large number of IDs are requested before starting the production of each batch. In such cases, the random ID generator 120 minimizes the response time to generate, record, and allocate the IDs. With the random ID generator 120, multiple manufacturing lines are able to request IDs for a same product almost concurrently. In certain embodiments, quantities requested can go up to 1 million IDs per request, and the random ID generator 120 generates IDs with acceptable turn-around time.

The random ID generator 120 uses a combination of a set of well-defined instructions and the data store 140 to generate random IDs. The random ID generator 120 randomizes the indexes and partitions the indexes into a fixed set (S). Then, the random ID generator 120 puts the set of indexes (S) in the data store 140. The random ID generator 120 identifies each set of indexes using a row ID.

While generating IDs, for a product, the random ID generator 120 randomizes the row IDs and groups adjacent row IDs to form a new Set (S1). When a request for IDs is received, the random ID generator 120 updates an availability in block inventory and then calculates the group from which IDs are to be selected for the request. The random ID generator 120 randomizes the indexes of that group and traverses sequentially on the randomized indexes and fetches the requested quantity of indexes, which are encoded to form IDS.

In certain embodiments, the creation of the set of indexes may be done at deploy time or installation time. In certain embodiments, the set of indexes is shared across a product.

In certain embodiments, the creation of the set of indexes is done upon receipt of a first request for a particular product. The request is received, for example, from a manufacturer of the product. For example, if the block size is large (e.g., 1 billion), then creation of the set of indexes will take time. So, then, the random ID generator 120 may create the set of indexes at deploy time. However, if the block size is small, then the random ID generator 120 may create the set of indexes when the first request is made.

In certain embodiments, for each product, there is a predefined index space. The random ID generator 120 divides the index space into multiple contiguous blocks. The size of the blocks can be configured by, for example, a user (e.g., a system administrator).

The processing of the random ID generator 120 may be divided into initial setup and ID generation (i.e., allocation and obtaining the IDs).

The initial setup randomizes the indexes and stores the indexes in an initial_index structure 148. The index, along with the start of a block of IDs, forms the ID. For example, assume that the start of the block is 500, and the index is 5, then the ID is 505. In certain embodiments, the block size may be very large (e.g., 1 billion) and an array of such large indexes may not be accommodated in the memory, so the indexes are randomized and stored as a set of indexes in a row of the initial_index structure 148. Then, each set of indexes is processed until all (e.g., the 1 billion) indexes are processed.

This initial_index structure 148 is shared by products for generating IDs. In certain embodiments, this initial setup may be done at deploy time or installation time.

FIG. 3 illustrates, in a flow diagram, logic performed by the random ID generator 120 to perform initial setup in accordance with certain embodiments. FIG. 3 is formed by FIGS. 3A, 3B, 3C and 3D. Control begins in block 300 with the random ID generator 120 obtaining a block_size 132, an initial randomizing_size 134, and an indexes_per_initial_indexes_structure_size 136 from the configuration data 130. For example, the block size may be 1 billion, the initial_randomizing_size may be 50 million, and the indexes_per_initial_indexes_structure_size may be 1 million.

In certain embodiments, the block_size 132 is in multiples of a million, the block_size % indexes_per_initial_indexes_structure_size=0, and the initial_randomizing_size % indexes_per_initial_indexes_structure_size=0. The % symbol is used herein to refer to remainder (e.g., 9%5=4). These are some validations that the random ID generator 120 performs on the configuration data 120.

In block 302, the random ID generator 120 generates a seed (Seed1). Any known technique for generating the seed may be used. In block 304, the random ID generator 120 initializes a lower_limit to zero (i.e., lower_limit=0) and an upper_limit to zero (i.e., upper_limit=0).

Blocks 306 through 316 perform a level of randomization of the index and stores the index in the initial_index structure 148.

Figure 3A:
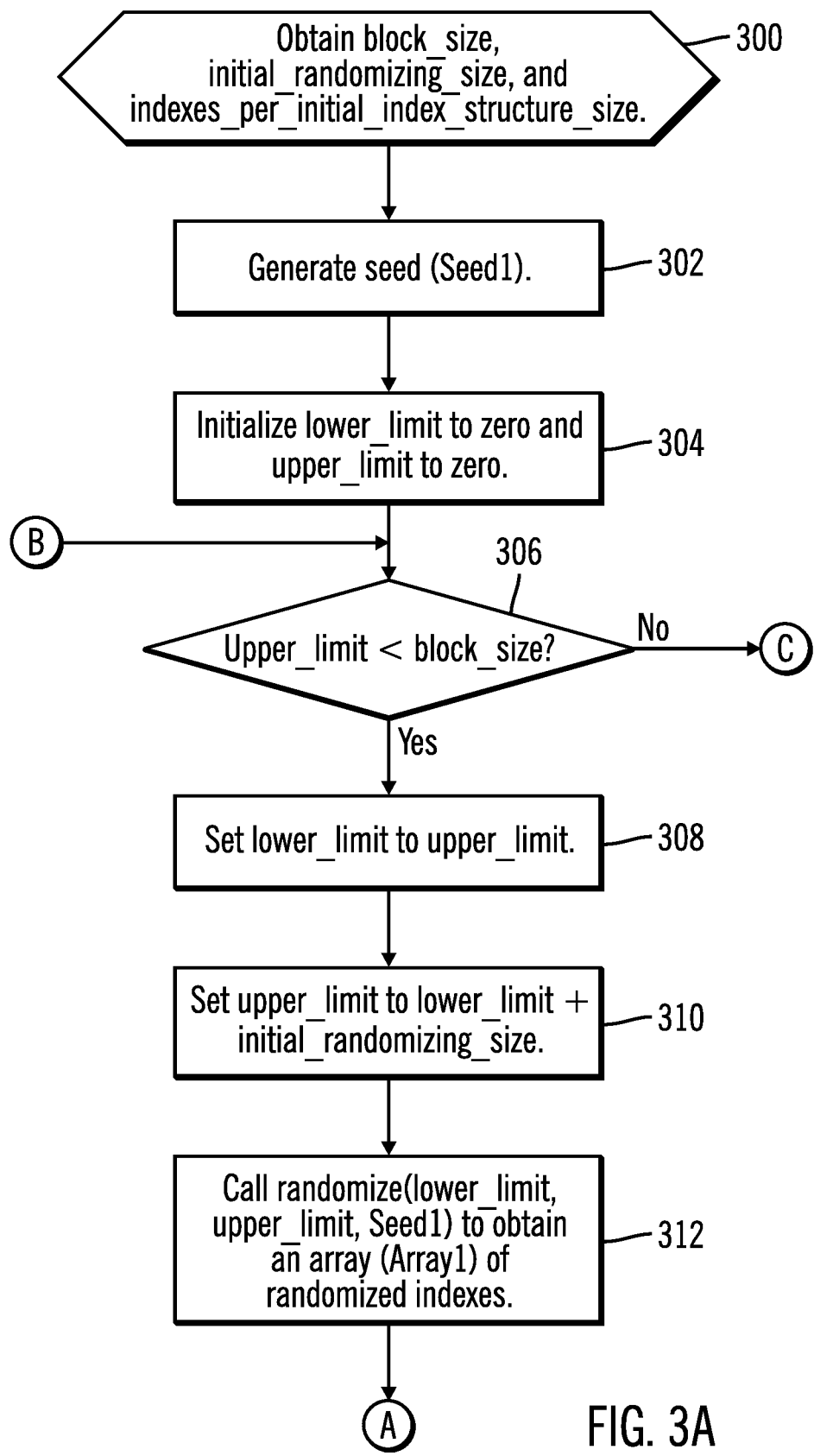
FIG. 3 illustrates, in a flow diagram, logic performed by a random ID generator to perform initial setup in accordance with certain embodiments.

In block 306, the random ID generator 120 determines whether the upper_limit is less than (<) the block_size 132. If the upper_limit is less than the block_size 132, then processing continues to block 308 (FIG. 3A), otherwise, processing continues to block 318 (FIG. 3C). In block 308, the random ID generator 120 sets the lower_limit equal to the upper_limit (i.e., lower_limit=upper_limit) and in block 310, sets the upper_limit equal to the lower_limit plus the initial_randomizing_size (i.e., upper_limit=lower_limit+initial_randomizing_size). In block 312, the random ID generator 120 calls randomize (lower_limit, upper_limit, S1 (seed)) to obtain an array (Array1) of randomized indexes. In certain embodiments, the randomize function takes as input a lower_limit, an upper_limit, and a seed and returns randomized indexes in an array.

Figure 3B:
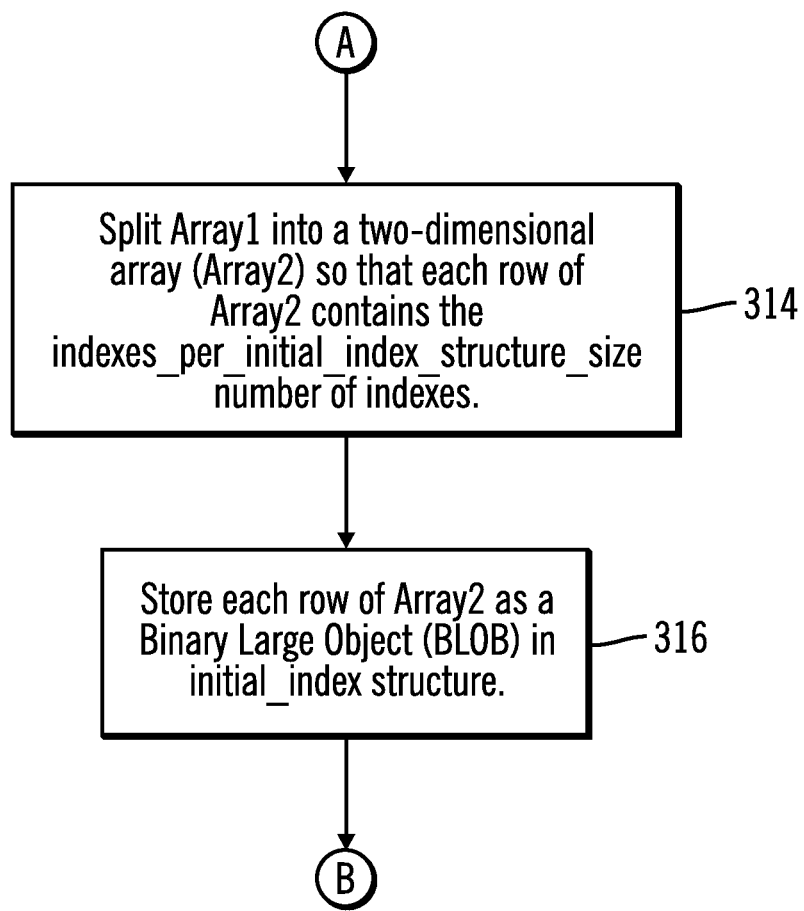
Figure 3C:
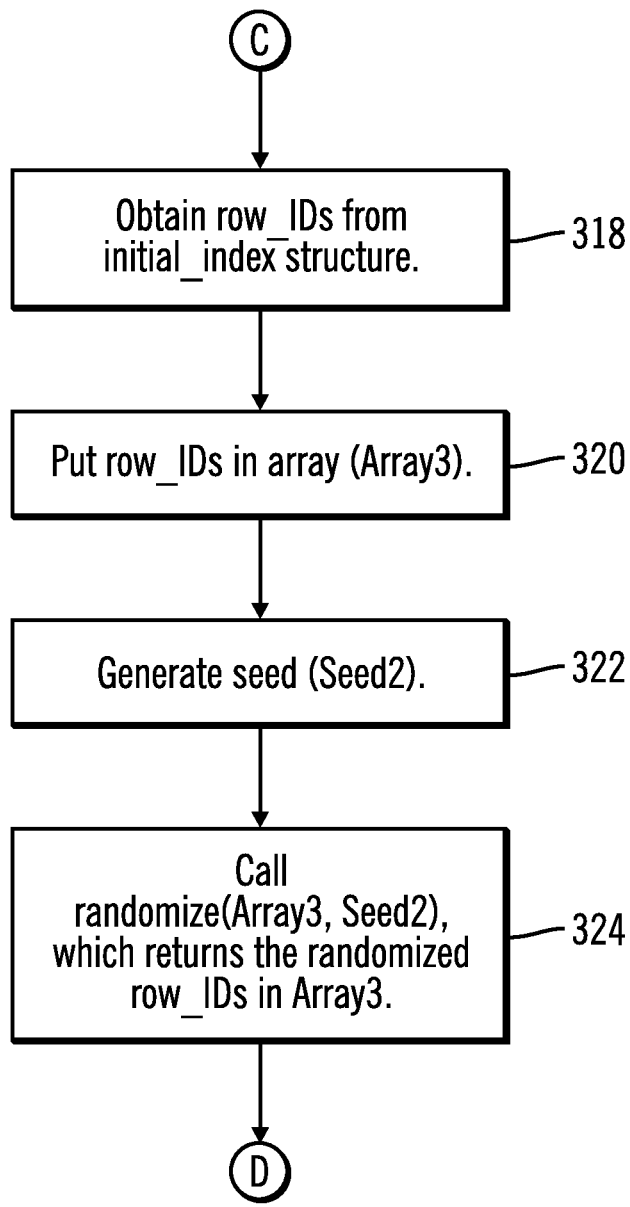

From block 312 (FIG. 3A), processing continues to block 314 (FIG. 3B). In block 314, the random ID generator 120 splits Array1 into a two-dimensional Array (Array2) so that each row of Array2 contains the indexes_per_initial_index_structure_size number of indexes. In block 316, the random ID generator 120 stores each row of Array2 as a Binary Large Object (BLOB) in the initial_index structure 148. From block 316 (FIG. 3B) processing returns to block 306 (FIG. 3A).

Figure 3D:
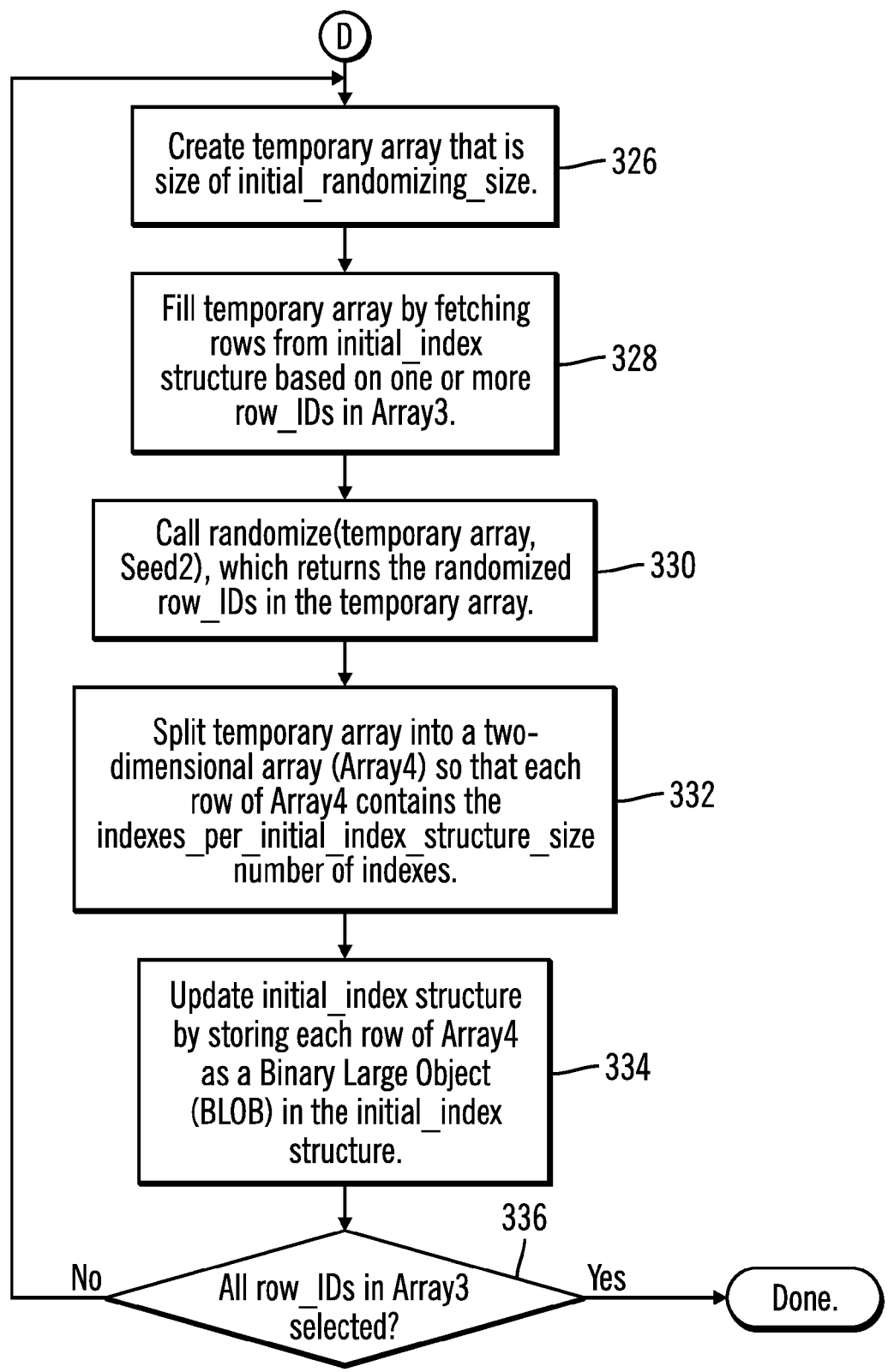

From block 306 in block FIG. 3A, if the upper_limit is greater than or equal to (>=) the block_size, processing continues to block 318 (FIG. 3C). In block 318, the random ID generator 120 obtains the row_IDs from the initial_index structure 148. In block 320, the random ID generator 120 stores the row_IDs in an array (Array3). In block 322, the random ID generator 120 generates a new seed (Seed2). In block 324, the random ID generator 120 calls randomize (Array3, Seed2), which returns the randomized row_IDs in Array3. From block 324 (FIG. 3C), processing continues to block 326 (FIG. 3D).

Blocks 326 through 336 obtain a subset of indexes from the initial_index structure 148 and perform another level of randomization.

In block 326, the random ID generator 120 creates a temporary array that is the size of initial_randomizing_size. In block 328, the random ID generator 120 fills the temporary array by fetching indexes (from the column: BLOB_of_randomized_indexes) from the initial_index structure 148 based on one or more row_IDs from Array3. For example, the random ID generator 120 gets the row_ID from Array3 and fetches indexes from the initial_index structure 148 based on the row_ID. Then, the random ID generator 120 gets one or more additional row_IDs from Array3 and adds indexes from the initial_index structure 148 until the temporary array is full.

In block 330, the random ID generator 120 calls randomize (temporary array, Seed2), which returns the randomized row_IDs in the temporary array. In block 332, the random ID generator 120 splits the temporary array into a two-dimensional array (Array4) so that each row of Array4 contains the indexes_per_initial_index_structure_size number of indexes. In block 334, the random ID generator 120 updates the initial_index structure 148 by storing each row of Array4 as a Binary Large Object (BLOB) in the initial_index structure 148. In block 336, the random ID generator 120 determines whether all row_IDs in Array3 have been selected. If so, processing is done, otherwise, processing loops back to block 326.

Once initial setup is complete, the IDs can be allocated. In certain embodiments, the random ID generator 120 allocates a set of IDs to a user (e.g., a manufacturer). When a request for IDs is received for a product with a requested quantity, the random ID generator 120 determines whether the block exists or whether it is possible to return the requested quantity of IDs from the block. If not, the random ID generator 120 creates a new block, fetches the row_IDs from the initial_index structure 148, randomizes the row_IDs, and stores the row_IDs in the random_ID structure 146. Based on the quantity requested and current availability, the random ID generator 120 calculates the start index and end index and then updates the availability of the block. The random ID generator 120 calls the getIDs( ) function, which returns a set of indexes. These indexes are encoded (e.g., with the start of the block and product details) to make the IDs (e.g., serial IDs).

In certain embodiments, an allocateIDs function is provided having the form: allocateIDs (product ID, requested Quantity) and returns a set of IDs. That is, the allocateIDs function takes as input a product ID and a requested quantity and returns a set of IDs of the quantity requested.

Figure 4A:
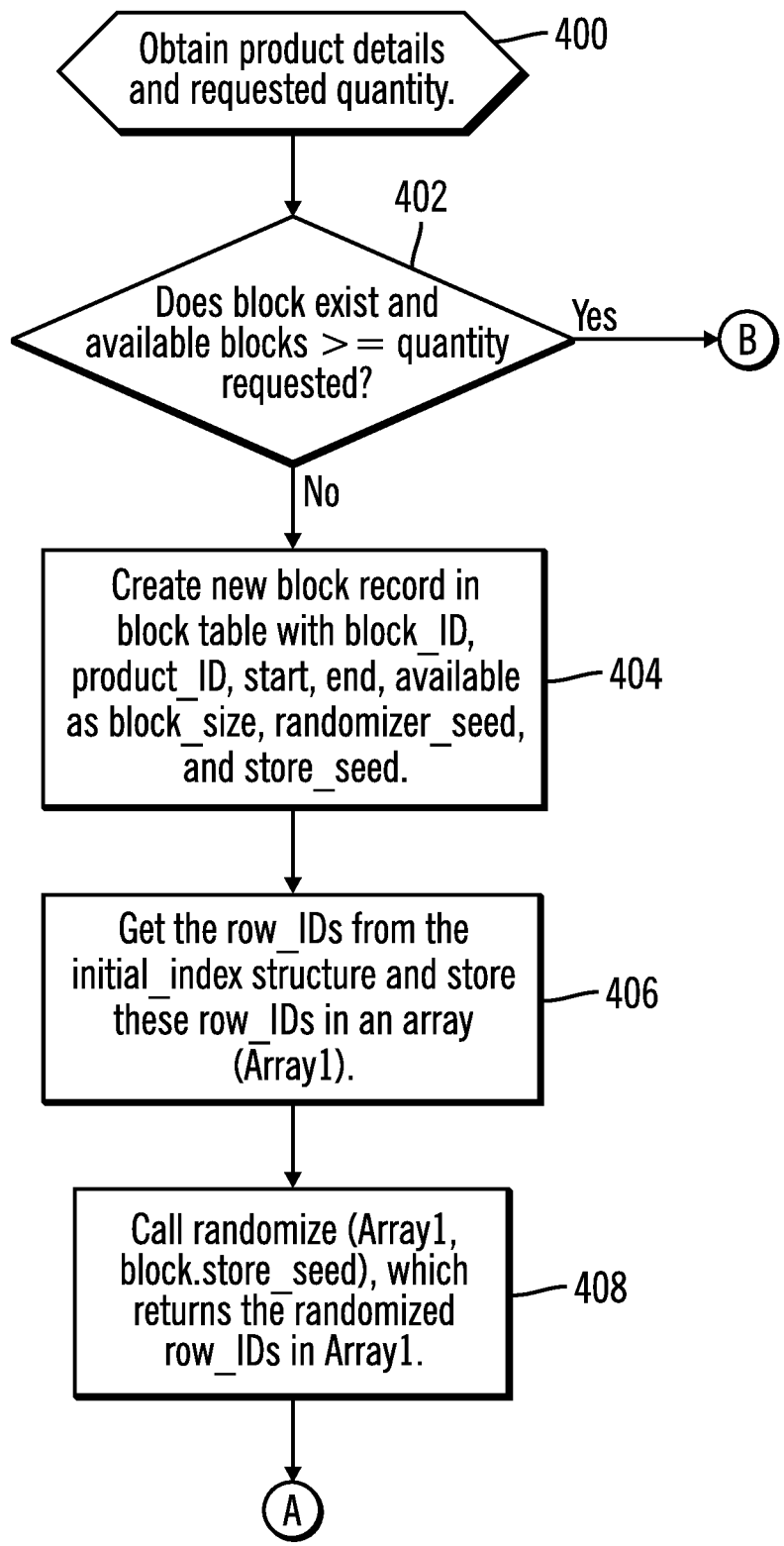
FIG. 4 illustrates, in a flow diagram, logic performed by a random ID generator to allocate IDs in accordance with certain embodiments.
Figure 4B:
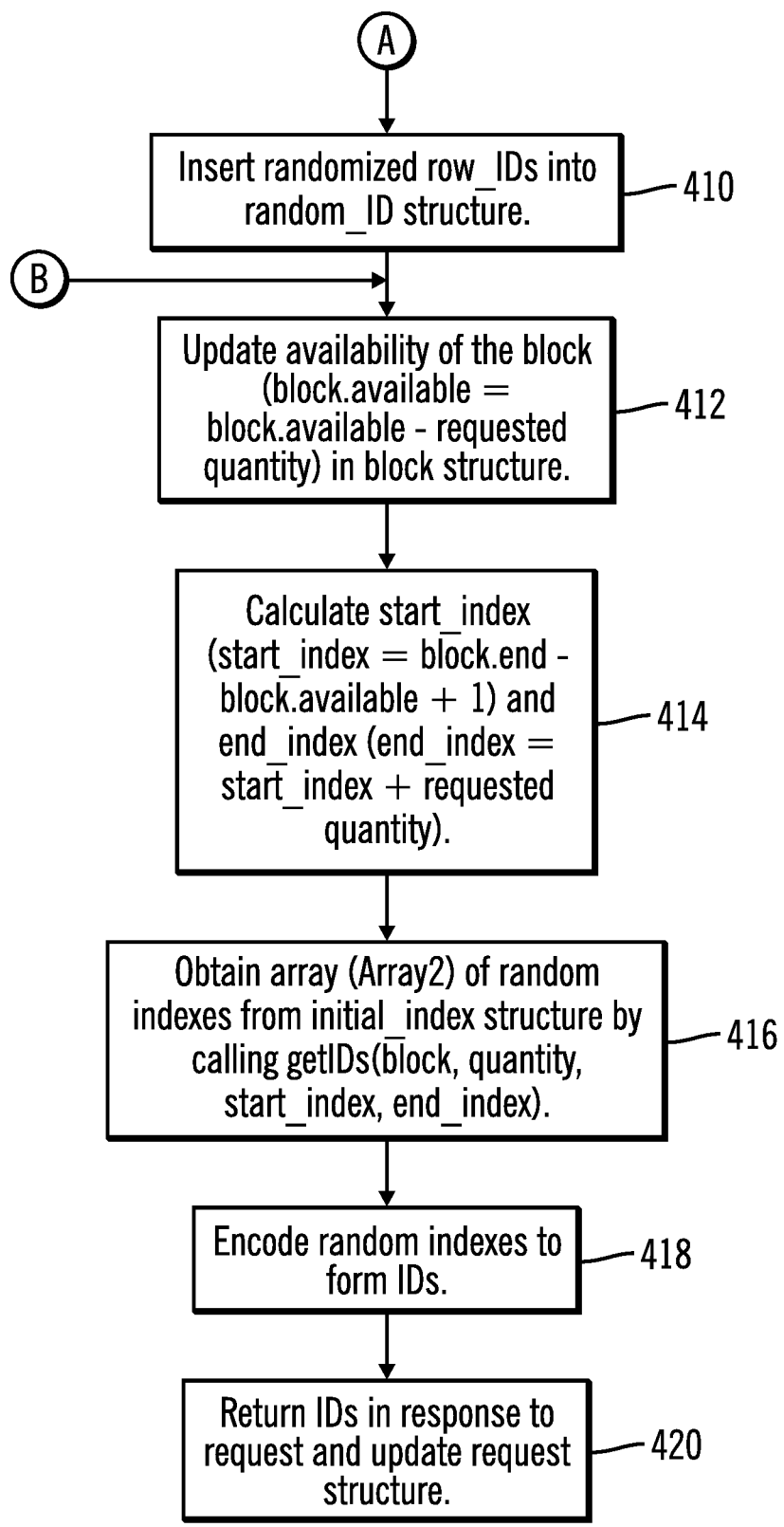

FIG. 4 illustrates, in a flow diagram, logic performed by the random ID generator 120 to allocate IDs in accordance with certain embodiments. FIG. 4 is formed by FIGS. 4A and 4B. Control begins in block 400 with the random ID generator 120 obtaining Get product details and a requested quantity (e.g., from a user). In block 402, the random ID generator 120 determines whether a block exists and whether the IDs available in the block are greater than or equal to the quantity requested. If so, processing continues to block 412 (FIG. 4B), otherwise, processing continues to block 404.

In block 404, the random ID generator 120 creates a new block record in the block structure 144 with a block_ID, product_ID, start, an end, an available as block_size number, a randomizer_seed, and a store_seed.

In block 406, the random ID generator 120 gets the row_IDs from the initial_index structure 148 and stores these row_IDs in an array (Array1). In block 408, the random ID generator 120 calls randomize (Array1, block.store_seed), which returns the randomized row_IDs in Array1.

From block 408 (FIG. 4A) processing continues to block 410 (FIG. 4B). In block 410, the random ID generator 120 inserts the randomized row_IDs from Array1 into the random_ID structure 146. In block 412, the random ID generator 120 updates the availability of the block (block.available=block.available−requested quantity) in the block structure 144. In block 414, the random ID generator 120 calculates the start_index (start_index=block.end−block.available+1) and end_index (end_index=start_index+requested quantity). For example, a new block is created with block.start=0 and block.end=9 and block.available=10, and the requested quantity is 3. Then, start_index=(block.end−block.available+1)=9−10+1=0, and end_index=(start_index+requested quantity)=0+3=3. In block 416, the random ID generator 120 obtains an array (Array2) of random indexes from the initial_index structure 148 by calling getIDs (block, quantity, start_index, end_index). In block 418, the random ID generator 120 encodes the random indexes to form IDs (e.g., serial IDs). In block 420, the random ID generator 120 returns the IDs in response to the request and updates the request structure 150).

In certain embodiments, a getIDs function is provided having the form: getIDs (block, Quantity, start_index, end_index) and returns a set of indexes. The getIDs function that takes as input details of a block of indexes to be used a quantity of IDs to be generated, a start_index (which identifies a particular index), and an end_index (which identifies a particular index). The random ID generator 120 uses the getIDs function to retrieve indexes. In particular, the getIDs function fetches the row_IDs from the random_ID structure 146 and groups these row_IDs in such a way that each group contains a row_ID_group number of row identifiers. If row_ID_group is two, then the row_IDs are grouped with two row_IDs in each group. For example, the row_ID_group may be configured by a user or hard coded. The row_ID_group may be hard codes for faster ID generation). In certain embodiments, the row_ID_group is two. Based on the start index and end index, the getIDs function calculates which group from which the indexes are selected. If a start group and an end group are the same, the getIDs function gets the indexes from that group, does a randomization, calculates the lower limit and upper limit, and gets the indexes from the randomized indexes. If the start group and end group are not the same, then the getIDs function iterates through each group and gets the indexes.

FIG. 5 illustrates, in a flow diagram, logic performed by the random ID generator 120 to get IDs in accordance with certain embodiments. FIG. 5 is formed by FIGS. 5A, 5B, 5C, 5D, and 5E. Control begins in block 500 with the random ID generator 120 obtaining an array (call it Array0) of randomized row_IDs from random_ID structure based on block.block_ID (which identifies a block of IDs). In block 502, the random ID generator 120 initializes the row_ID_group (e.g., the value of row_ID_group may be two) Based on the row_ID_group value, the random ID generator 120 groups row_IDs. In block 504, the random ID generator 120 calculates the start_group (start_group=start_index/(indexes_per_initial_ID_structure_size*row_ID_group)) and end_group (end_group=end_index/(indexes_per_initial_ID_structure_size*row_ID_group)). In equations, an asterisk ("*") represents multiplication, and a forward slash ("/") represents division. In block 506, the random ID generator 120 determines whether the start_group equals the end_group. If so, processing continues to block 508 (FIG. 5B), otherwise, processing continues to block 522 (FIG. 5D).

The processing of blocks 508 through 520 is executed when start_index and end_index are in a same group. In these blocks, the random ID generator 120 creates a temporary array to store the BLOBs retrieved from the initial_index structure 148. Then, the random ID generator 120 randomizes the temporary array using the randomizer_seed stored in the block structure 144. This re-creates the same sequence of randomized IDs. The random ID generator 120 calculates the lower_limit and upper_limit and fetches indexes from the temporary array based on the lower_limit and upper_limit.

In block 508, the random ID generator 120 initializes a temporary array of size (indexes_per_initial_index_structure_size*row_ID_group). In block 510, the random ID generator 120 calculates a start_BLOB_index (start_BLOB_index=start_group*row_ID_group) and an end_BLOB_index (end_BLOB_index=start_BLOB_index+1). In block 512, the random ID generator 120 gets the corresponding BLOBs from the initial_index structure 148 based on the row_IDs to form arrays Array1 (Array1=GetBLOBFromInitialIdStore (Array0 [Start_BLOB_index])) and Array2 (Array2=GetBLOBFromInitialIdStore (Array0 [End_BLOB_index])).

In block 514, the random ID generator 120 copies Array1 and Array2 into a temporary array. In block 516, the random ID generator 120 calls randomize (temporary array, block.randomizer_seed), which returns the randomized row_IDs in the temporary array.

Figure 5A:
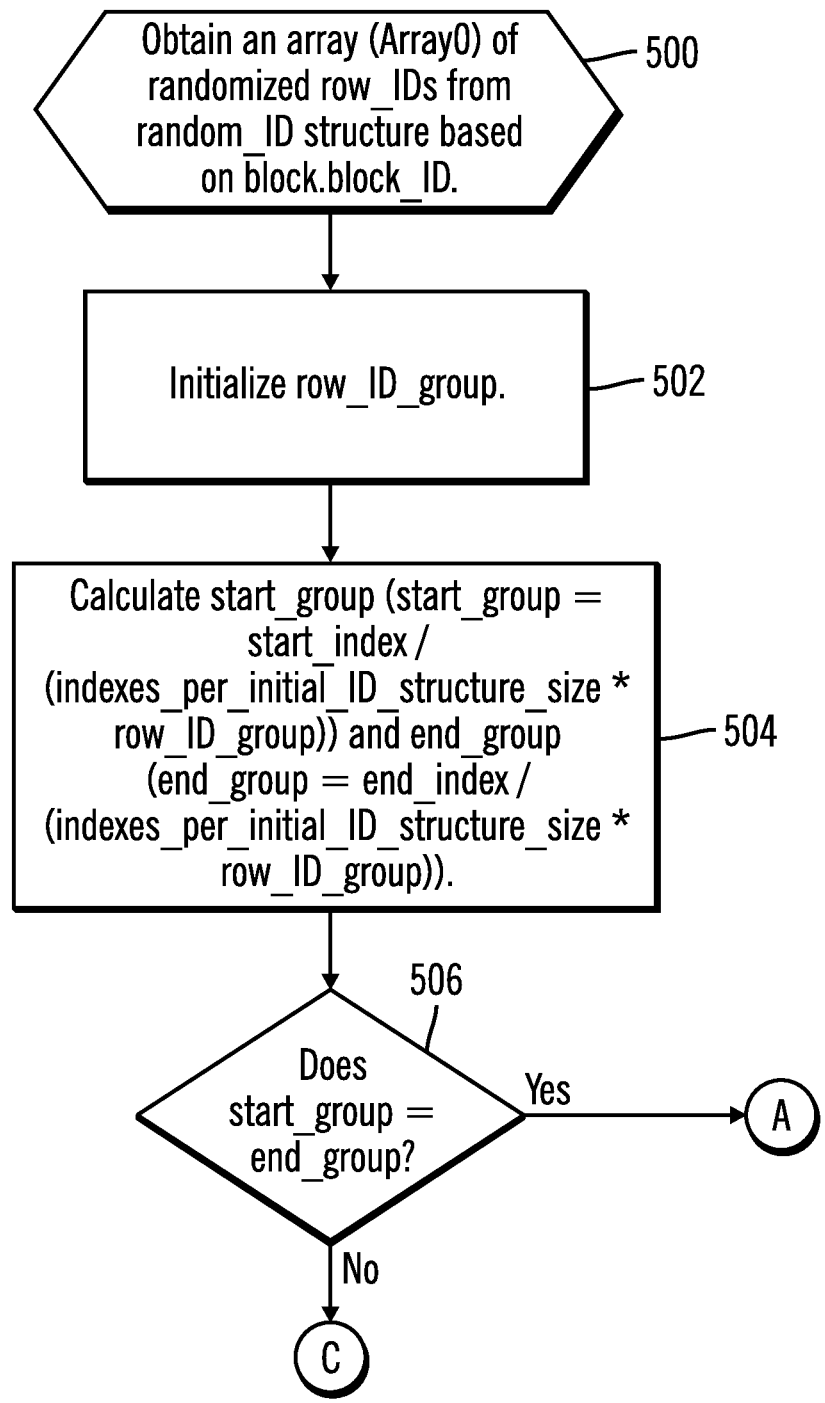
FIG. 5 illustrates, in a flow diagram, logic performed by a random ID generator to get IDs in accordance with certain embodiments.
Figure 5B:
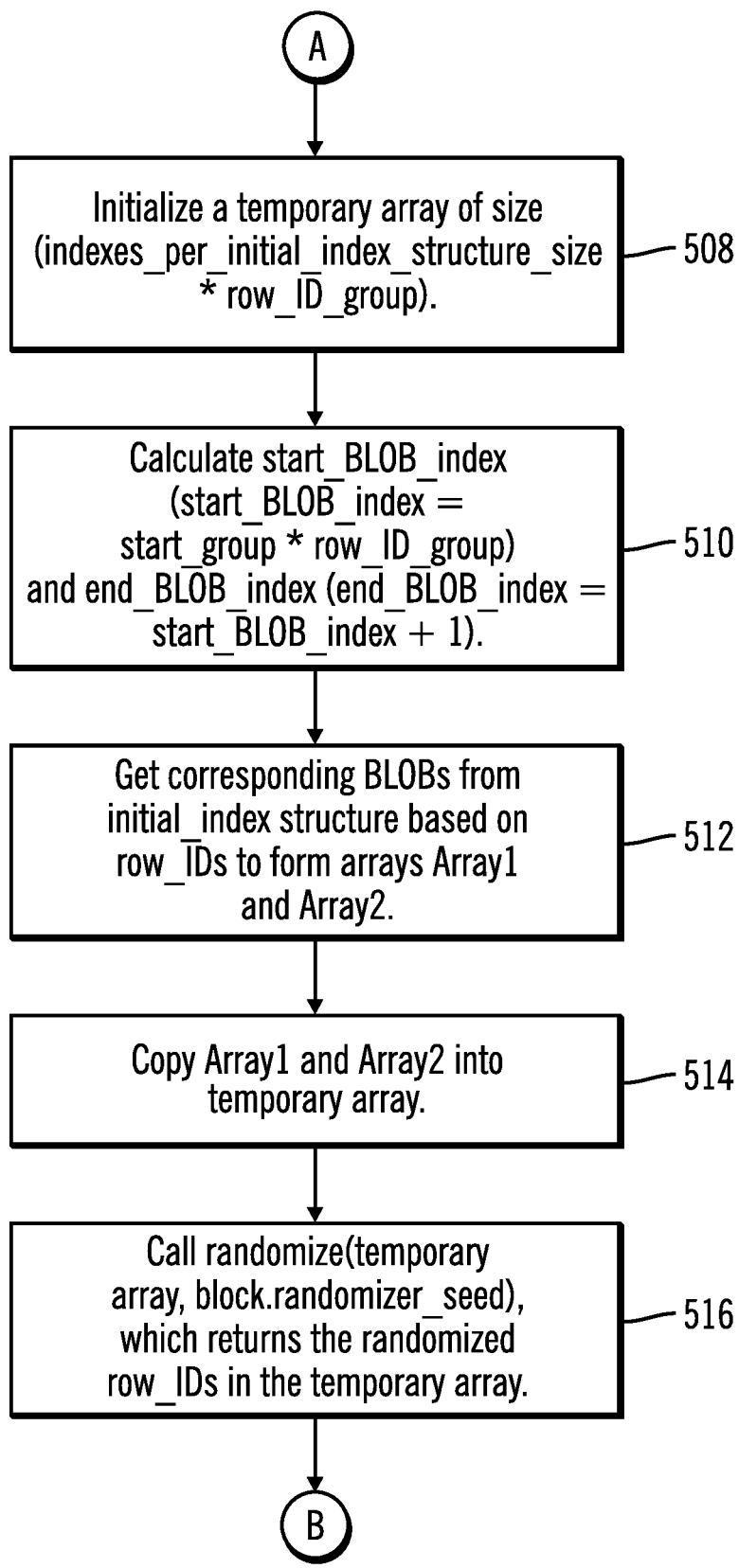
Figure 5C:
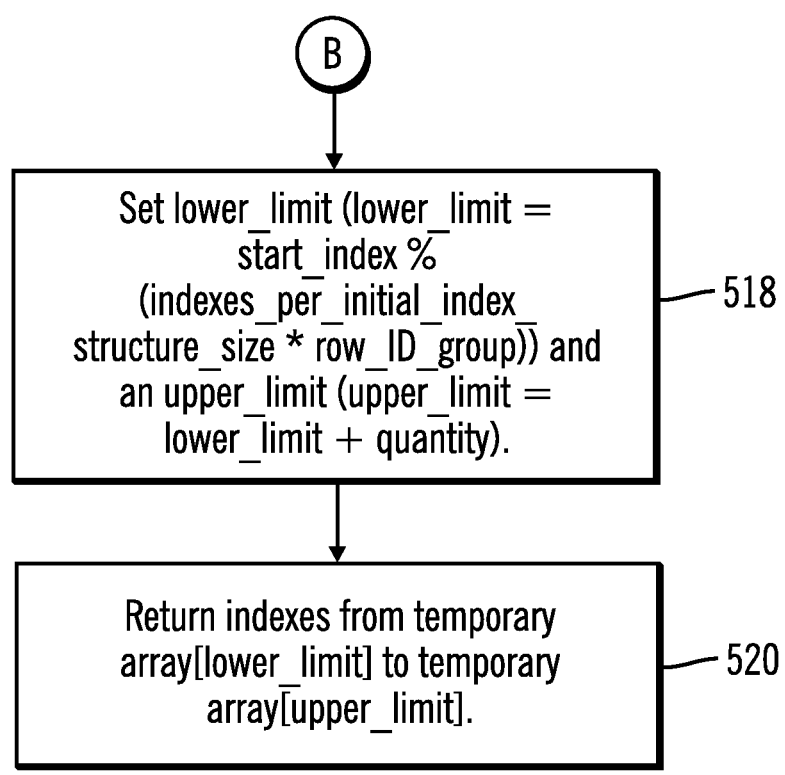

From block 516 (FIG. 5B), processing continues to block 518 (FIG. 5C). In block 518, the random ID generator 120 sets a lower_limit (lower_limit=start_index % (indexes_per_initial_index_structure_size*row_ID_group)) and an upper_limit (upper_limit=lower_limit+quantity). In block 520, the random ID generator 120 returns indexes from the temporary array[lower_limit] to the temporary array[upper_limit].

The processing of blocks 522 through 546 is executed if start_index and end_index are in different groups. In this case, the random ID generator 120 obtains the indexes from each group and returns these indexes.

In block 522, the random ID generator 120 initializes an array of size quantity named return_index_array. In block 524, the random ID generator 120 sets i to start_group. In block 526, the random ID generator 120 determines whether i is less than or equal to end_group. If so, processing continues to block 530, otherwise, processing continues to block 528. In block 528, the random ID generator 120 returns return_index_array.

In block 530, the random ID generator 120 increments i by one (i++). In block 532, the random ID generator 120 initializes a temporary array of size (indexes_per_initial_index_structure_size*row_ID_group). In block 534, the random ID generator 120 calculates start_BLOB_index (start_BLOB_index=i*row_ID_group) and end_BLOB_index (end_BLOB_index=start_BLOB_index+1)

Figure 5D:
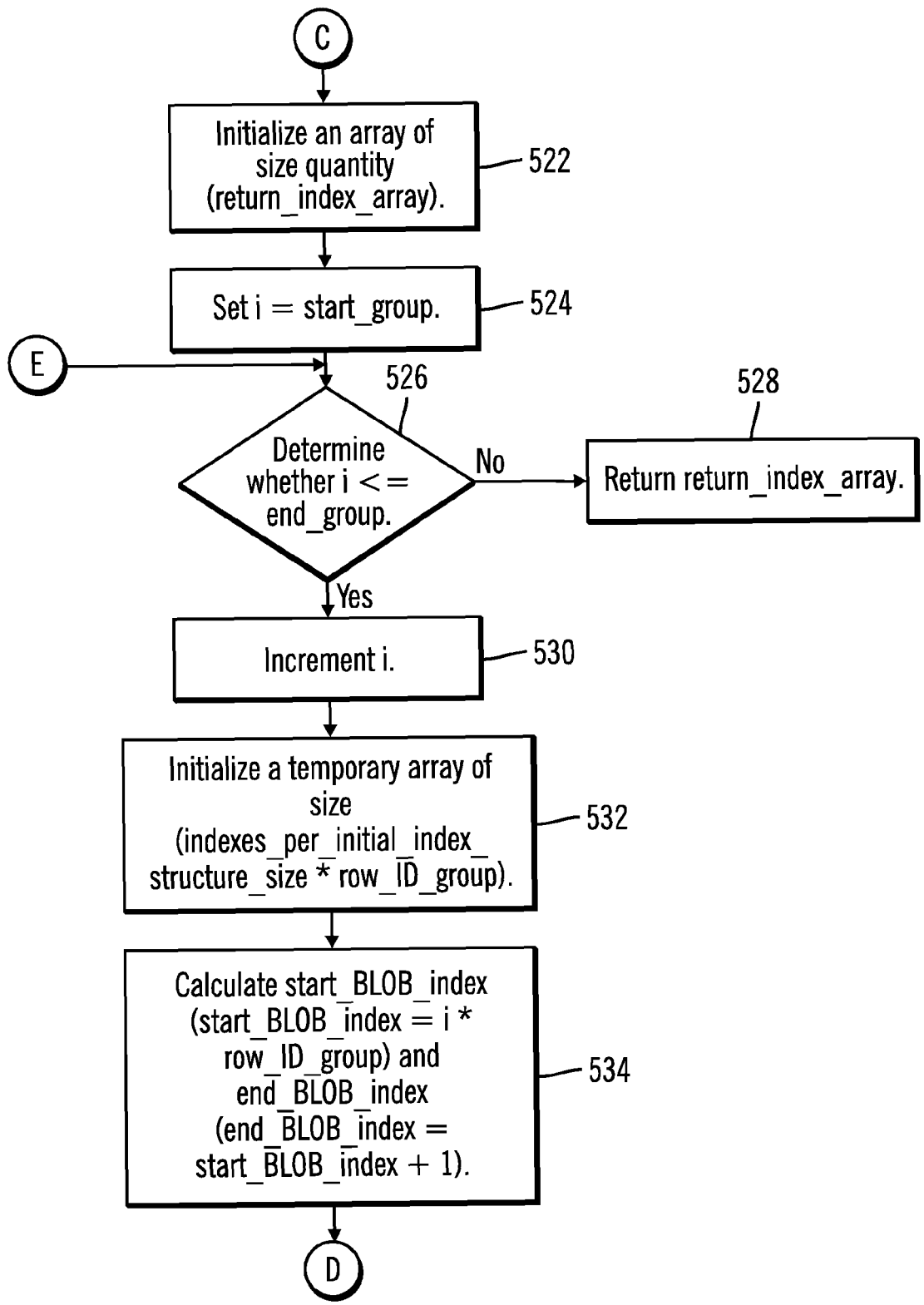
Figure 5E:
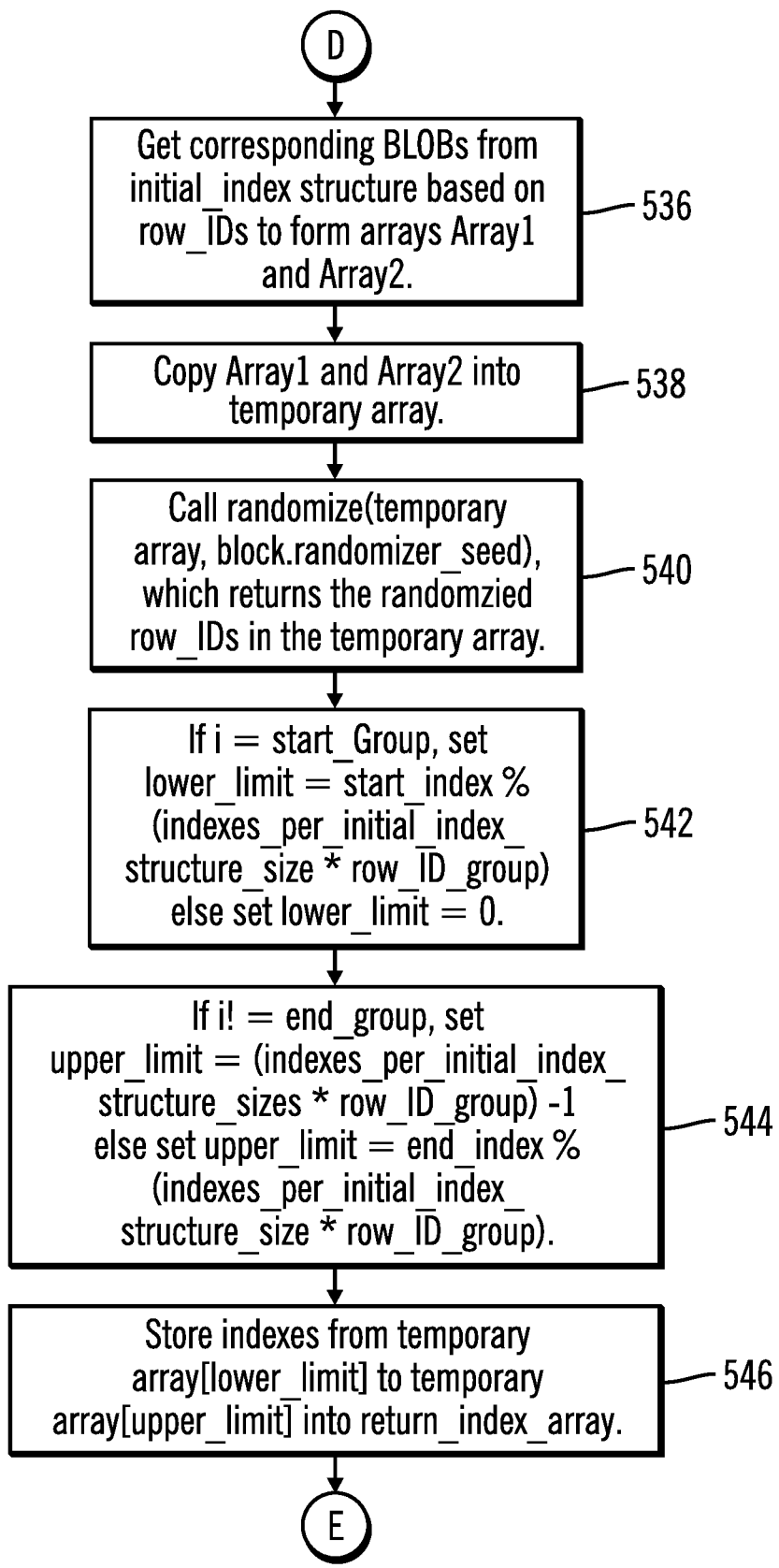

From block 534 (FIG. 5D), processing continues to block 536 (FIG. 5E). In block 536, the random ID generator 120 gets corresponding BLOBs from the initial_index structure 148 based on the row_IDs to form arrays Array1 (Array1=GetBlobFromInitialIdStore (Array0 [Start_BLOB_index])) and Array2 (Array2=GetBlobFromInitialIdStore (Array0 [End_BLOB_index])). In block 538, the random ID generator 120 copies Array1 and Array2 into the temporary array. In block 540, the random ID generator 120 calls randomize (temporary array, block.randomizer_seed), which returns the randomized row_IDs in the temporary array.

In block 542, if i equals start_Group, the random ID generator 120 sets the lower_limit to start_index % (indexes_per_initial_index_structure_size*row_ID_group), else the random ID generator 120 sets the lower_limit to zero. In block 544, if i does not equal end_group, the random ID generator 120 sets the upper_limit to (indexes_per_initial_index_structure_sizse*row_ID_group)−1, else the random ID generator 120 sets the upper_limit to end_index % (indexes_per_initial_index_structure_size*row_ID_group). In block 546, the random ID generator 120 stores the indexes from the temporary array[lower_limit] to the temporary array[upper_limit] into return_index_array. From block 546, processing loops back to block 526 (FIG. 5D).

In certain embodiments, a randomize function is provided having two forms: 1) randomize (IntegerArray, Seed), which returns randomized elements (e.g., indexes or row_IDs) in the IntegerArray that was provided as the first parameter, and 2) randomize (lower_limit, upper_limit, Seed), which returns a temporary array. The function randomize is used to randomize indexes or row_IDs. With the randomize function, given the same seed, the same sequence of indexes or row_IDs are generated.

In accordance with certain embodiments, the following pseudocode represents operations performed to randomize the indexes or row_IDs given an array for randomize (IntegerArray, Seed):

```
For(Integer i = IntegerArray.length; i > 1; i-- ) {
   Swap(IntegerArray[i-1] ,
   IntegerArray[RandomGenerator(Seed).nextInt(i)] )
}
return IntegerArray
```

In accordance with certain embodiments, the following pseudocode represents operations performed to randomize the indexes or row_IDs for randomize (lower_limit, upper_limit, Seed):

```
Initialize a temporary array with values starting from
lower_limit to upper_limit.
Call (temporary array, Seed)
Return temporary array
```

Any known technique for randomizing may be used in various embodiments.

Figure 6:
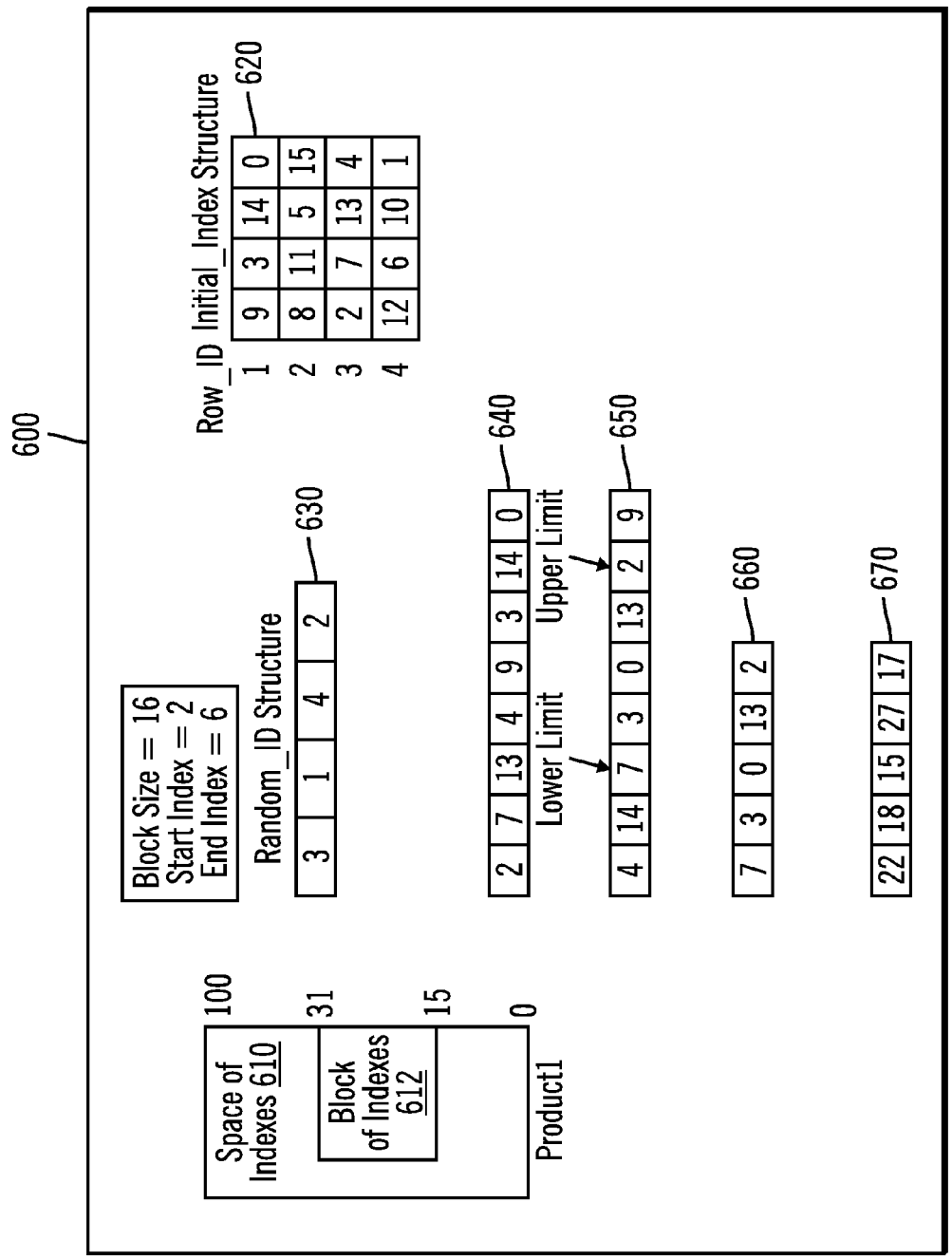
FIG. 6 illustrates, in a block diagram, structures used in accordance with certain embodiments.

FIG. 6 illustrates, in a block diagram, structures used in accordance with certain embodiments. In FIG. 6, the block size is 16, the start index is 2, and the end index is 6. The block of indexes 612 is a portion of the space of indexes 610.

The random ID generator 120 randomizes an array of 0 to 15 containing indexes and splits the randomized array into a set of segments, where each set has four indexes. The random ID generator 120 stores these randomized indexes in the initial_ID structure 620. In particular, the initial_index structure 620 stores a BLOB of indexes in each row (e.g. row_ID 1 is associated with BLOB1, which contains {9, 3, 14, 0}; row_ID 2 is associated with BLOB2, which contains {8, 11, 5, 15}; row_ID 3 is associated with BLOB3, which contains {2, 7, 13, 4}; and row_ID 4 is associated with BLOB 4, which contains {12, 6, 10, 1}).

When a request comes and there is no random_ID structure 146 for a block, then the random_ID generator 120 retrieves the row_IDs {1, 2, 3, 4} from the initial_index structure 620 and randomizes the row_IDs to obtain {3, 1, 4, 2}. The random ID generator 120 stores the randomized row_IDs (3, 1, 4, and 2) in the random_ID structure 630.

In FIG. 6, the row IDs for a block are {3, 1, 4, 2}. Here, there are two groups {{3,1}, {4,2}}, each containing a row_ID_group number of row identifiers (which has a value of 2 in this example).

Based on the start_index and end_index, the getIDs function finds that start_group=end_group=1. So, the group selected is {3, 1}, and the getIDs function fetches the indexes from the initial_index structure 620 for row_IDs {3, 1}, which are shown in structure 640 (i.e., {2, 7, 13, 4} are retrieved from row_ID 3 in the initial_index structure 620 and {9, 3, 14, 0} are retrieved from row_ID 1 in the initial_index structure 620). The random ID generator 120 randomizes these indexes to form structure 650, which contains {4, 14, 7, 3, 0, 13, 2, 9}. Then, the random ID generator 120 calculates the lower and upper limit. Then, the random ID generator 120 selects the indexes {7, 3, 0, 13, 2} from structure 650 based on the lower limit and the upper limit. The random ID generator 120 retrieves the indexes in structure 660 and the block size (which is 16 in this example) to form the serial IDs {22, 18, 15, 27, 17} in structure 670. The serial IDs {22, 18, 15, 27, 17} are encoded with product details and returned in response to the request for the IDS.

In certain embodiments, in real time, the block size may be 1 billion indexes, and randomizing an array of 1 billion may degrades the system performance, so the random ID generator 120 creates an array of 0 to 50 million indexes, does a randomization of the indexes in the array, and stores these indexes in a set of 50 rows, with each row containing 1 million indexes (e.g., stored as a Binary Large Object (BLOB)). Then, the random ID generator 120 selects the next set (e.g., 50 to 100 million indexes and performs the same processing, until all 1 billion indexes are processed.

Then, the random ID generator 120 fetches the row IDs for the initial_index structure 148 and randomizes these row IDs. The random ID generator 120 creates an array of 50 million indexes by fetching the indexes stored in a set of randomized row IDs and again performs one more level of randomization on the indexes and puts these randomized indexes back to the same rows (i.e., updates the rows in the initial_index structure 148). This process is repeated till the last randomized row ID is processed.

For example, the second category of solution (described above in paragraph [0007]), stores the serial ID, product, and state in the data store. In this example, assume that a manufacturer has 50 products, and the manufacture wants to generate the IDs from a space of 1 billion indexes. Then, the manufacturer needs to pre-insert 50 billion rows. When a request for the IDs is received, an update is performed on the pre-inserted rows. The data store size grows substantially whenever a new product is added (i.e., another 1 billion rows). In reality, the number of products created by a manufacturer is very high. Embodiments provide a shared index set across the product and will cater to a request of 1 million IDs in less turn around time, thus optimizing the data store growth.

Thus, the random ID generator 120 generates IDs from a larger block with short turn-around time. The random ID generator 120 shares the index set across a product. The random ID generator 120 stores minimum configuration data (e.g., metadata) to recreate the IDs. The random ID generator 120 generates the secured sequence by multi-level randomization.

Thus, the random ID generator 120 provides scalability of block size (e.g., block size can be 1 or 2 billion). The random ID generator 120 provides a highly secured sequence with multi-level randomization results stored in a secured sequence. The random ID generator 120 provides constant (i.e., the same) turn-around time with respect to scalability. For example, the turn-around time is the same for a block size of one or two billion IDs. With the random ID generator 120, an average case for retrieving randomized IDs takes X time, while a worst case takes 2× time, where the requested quantity<=indexes_per_initial_index_structure_size. The random ID generator 120 uses constant memory or heap size with respect to scalability. The random ID generator 120 provides archival of IDs since the metadata for the randomization is stored. Also, the same set of IDs may be recreated from the metadata. The random ID generator 120 uses less database storage (i.e., consider N products where each product consumes S storage space, then total database storage is (N*S)). Also, in certain embodiments, the initial_index structure 148 may be shared by all products, so the space consumed is (S) in such embodiments.

In certain embodiments, the random ID generator 120 generates guaranteed unique ID's by randomizing indexes, partitioning the indexes into fixed sets, and storing these randomized indexes at deploy time or installation time. These indexes may be shared across multiple products (e.g., of a manufacturer). For example, a manufacturer may produce cell phones and laptops, and the indexes may be used for serial IDs for both the cell phones and the laptops.

Also, the random ID generator 120 randomizes the row ID's and groups adjacent row IDs to form a new set. Then, on a request for IDs, the random ID generator 120 updates the availability in a block inventory and identifies a group from which IDs may be catered. The random ID generator 120 again randomizes the indexes of that group and traverses sequentially on the randomized indexes to fetch the requested quantity of IDs.

Embodiments herein provide a way to allocate and manage random identifiers using a shared index set across products.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc.

Figure 7:
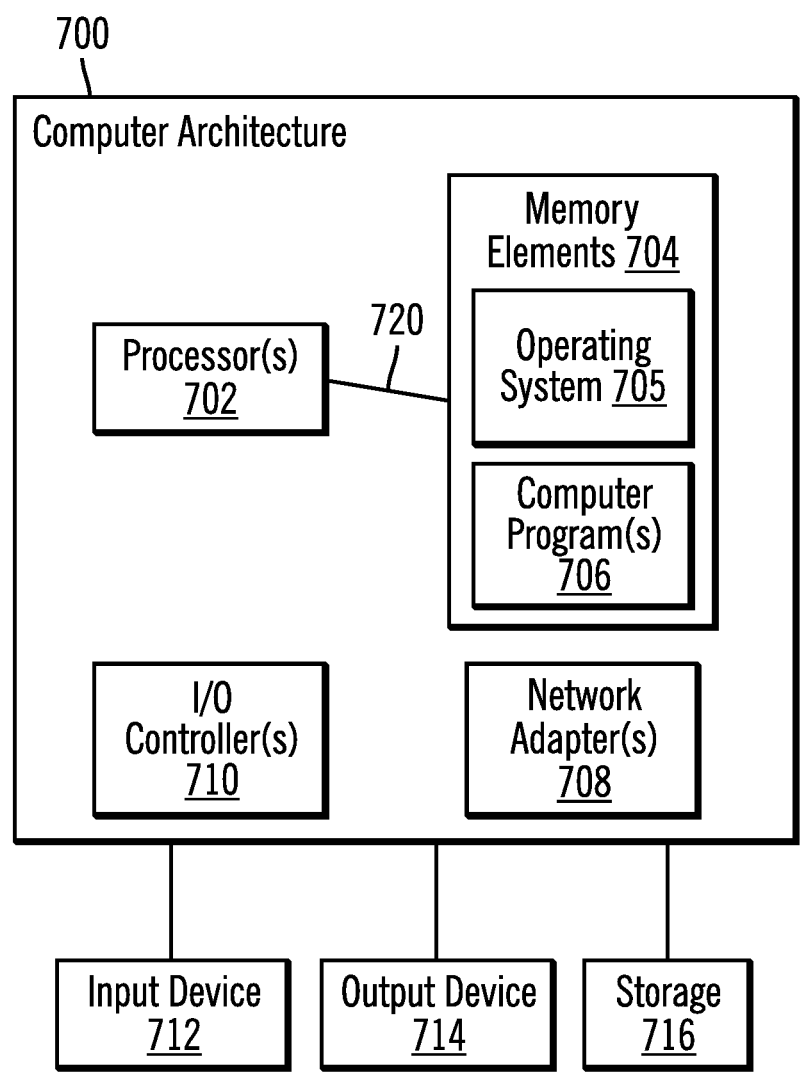
FIG. 7 illustrates a computer architecture that may be used in accordance with certain embodiments.

FIG. 7 illustrates a computer architecture 700 that may be used in accordance with certain embodiments. Computing device 100 may implement computer architecture 700. The computer architecture 700 is suitable for storing and/or executing program code and includes at least one processor 702 coupled directly or indirectly to memory elements 704 through a system bus 720. The memory elements 704 may include local memory employed during actual execution of the program code, bulk storage, and cache memories which provide temporary storage of at least some program code in order to reduce the number of times code must be retrieved from bulk storage during execution. The memory elements 704 include an operating system 705 and one or more computer programs 706.

Input/Output (I/O) devices 712, 714 (including but not limited to keyboards, displays, pointing devices, etc.) may be coupled to the system either directly or through intervening I/O controllers 710.

Network adapters 708 may also be coupled to the system to enable the data processing system to become coupled to other data processing systems or remote printers or storage devices through intervening private or public networks. Modems, cable modem and Ethernet cards are just a few of the currently available types of network adapters 708.

The computer architecture 700 may be coupled to storage 716 (e.g., a non-volatile storage area, such as magnetic disk drives, optical disk drives, a tape drive, etc.). The storage 716 may comprise an internal storage device or an attached or network accessible storage. Computer programs 706 in storage 716 may be loaded into the memory elements 704 and executed by a processor 702 in a manner known in the art.

The computer architecture 700 may include fewer components than illustrated, additional components not illustrated herein, or some combination of the components illustrated and additional components. The computer architecture 700 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method, comprising:
   selecting, using a processor of a computer, row identifiers from an initial index structure storing rows of randomized indexes;
   randomizing the row identifiers;
   selecting a set of the randomized row identifiers;
   retrieving the randomized indexes from the initial index structure that correspond to the selected set of the randomized row identifiers; and
   encoding the retrieved, randomized indexes to form identifiers.

2. The method of claim 1, further comprising:
   forming groups with the randomized row identifiers so that each group has a predetermined number of the randomized row identifiers;
   selecting at least one group from the groups; and
   selecting the set of the randomized row identifiers form the selected at least one group.

3. The method of claim 1, further comprising:
   randomizing the retrieved, randomized indexes;
   selecting a number of the retrieved, randomized indexes;
   encoding the selected number of the retrieved, randomized indexes; and
   returning the encoded indexes in response to a request for a quantity of indexes.

4. The method of claim 3, further comprising:
   calculating a lower limit and an upper limit; and
   using the lower limit and the upper limit to select the number of the retrieved, randomized indexes.

5. The method of claim 1, further comprising:
   randomizing the selected indexes; and
   storing the randomized indexes in the initial index structure.

6. The method of claim 1, wherein the initial index structure is shared by multiple products, and wherein the encoding identifies a particular product from the multiple products.

7. A computer system, comprising:
   a processor; and
   a storage device coupled to the processor, wherein the storage device stores a computer program, and wherein the processor executes the computer program to perform operations, the operations comprising:
   selecting row identifiers from an initial index structure storing rows of randomized indexes;
   randomizing the row identifiers;
   selecting a set of the randomized row identifiers;

retrieving the randomized indexes from the initial index structure that correspond to the selected set of the randomized row identifiers; and encoding the retrieved, randomized indexes to form identifiers.

8. The computer system of claim 7, further comprising:
forming groups with the randomized row identifiers so that each group has a predetermined number of the randomized row identifiers;
selecting at least one group from the groups; and
selecting the set of the randomized row identifiers form the selected at least one group.

9. The computer system of claim 7, further comprising:
randomizing the retrieved, randomized indexes;
selecting a number of the retrieved, randomized indexes;
encoding the selected number of the retrieved, randomized indexes; and
returning the encoded indexes in response to a request for a quantity of indexes.

10. The computer system of claim 9, further comprising:
calculating a lower limit and an upper limit; and
using the lower limit and the upper limit to select the number of the retrieved, randomized indexes.

11. The computer system of claim 7, further comprising:
randomizing the selected indexes; and
storing the randomized indexes in the initial index structure.

12. The computer system of claim 7, wherein the initial index structure is shared by multiple products, and wherein the encoding identifies a particular product from the multiple products.

13. A computer program product comprising a non-transitory computer readable storage medium including a computer readable program, wherein the computer readable program when executed by a processor on a computer causes the computer to perform:
selecting row identifiers from an initial index structure storing rows of randomized indexes;
randomizing the row identifiers;
selecting a set of the randomized row identifiers;
retrieving the randomized indexes from the initial index structure that correspond to the selected set of the randomized row identifiers; and
encoding the retrieved, randomized indexes to form identifiers.

14. The computer program product of claim 13, further comprising:
forming groups with the randomized row identifiers so that each group has a predetermined number of the randomized row identifiers;
selecting at least one group from the groups; and
selecting the set of the randomized row identifiers form the selected at least one group.

15. The computer program product of claim 13, further comprising:
randomizing the retrieved, randomized indexes;
selecting a number of the retrieved, randomized indexes;
encoding the selected number of the retrieved, randomized indexes; and
returning the encoded indexes in response to a request for a quantity of indexes.

16. The computer program product of claim 15, further comprising:
calculating a lower limit and an upper limit; and
using the lower limit and the upper limit to select the number of the retrieved, randomized indexes.

17. The computer program product of claim 13, further comprising:
randomizing the selected indexes; and
storing the randomized indexes in the initial index structure.

18. The computer program product of claim 13, wherein the initial index structure is shared by multiple products, and wherein the encoding identifies a particular product from the multiple products.

* * * * *